(12) United States Patent
Yu

(10) Patent No.: US 8,686,781 B2
(45) Date of Patent: Apr. 1, 2014

(54) VOLTAGE-MODE DRIVER WITH CONTROLLABLE OUTPUT SWING

(75) Inventor: Tsung-Hsin Yu, Jhudong Township (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/114,860

(22) Filed: May 24, 2011

(65) Prior Publication Data

US 2012/0092057 A1 Apr. 19, 2012

Related U.S. Application Data

(60) Provisional application No. 61/394,488, filed on Oct. 19, 2010.

(51) Int. Cl.
*H03L 5/00* (2006.01)
(52) U.S. Cl.
USPC .......................................... 327/309; 327/306

(58) Field of Classification Search
USPC .................................. 327/108, 306, 309, 333
See application file for complete search history.

(56) References Cited

U.S. PATENT DOCUMENTS

| 7,109,759 | B2 * | 9/2006 | Tseng | 326/115 |
|---|---|---|---|---|
| 7,443,204 | B2 | 10/2008 | Phang et al. | |
| 7,868,804 | B2 * | 1/2011 | Khoury et al. | 341/144 |
| 7,956,645 | B2 * | 6/2011 | Momtaz | 326/83 |
| 7,977,997 | B2 * | 7/2011 | King | 327/333 |
| 2004/0246613 | A1 | 12/2004 | Tseng | |
| 2009/0190648 | A1 * | 7/2009 | Sakano et al. | 375/232 |

\* cited by examiner

*Primary Examiner* — Dinh T. Le

(74) *Attorney, Agent, or Firm* — Lowe Hauptman & Ham, LLP

(57) ABSTRACT

A circuit includes a first node, a second node, a pull-up circuit selectively coupled to the first node or the second node, a pull-down circuit selectively coupled to the first node or the second node, and a resistive circuit. The circuit is configured to operate in a full-swing mode or in a de-emphasis mode based on an electrical coupling of the resistive circuit between the first node and the second node.

20 Claims, 12 Drawing Sheets

VOLTAGE-MODE DRIVER WITH CONTROLLABLE OUTPUT SWING

CROSS-REFERENCE TO RELATED APPLICATIONS

The present application claims priority of U.S. Provisional Patent Application Ser. No. 61/394,488, filed on Oct. 19, 2010, which is incorporated herein by reference in its entirety.

FIELD

The present disclosure is related to a voltage-mode driver having a controllable output swing.

BACKGROUND

Serial/De-serial (SERDES) drivers or transmitters include two major modes: a current mode and a voltage mode. For a full swing transmission, e.g., in the Universal Serial Bus (USB) 1.1 version, the voltage mode is used because it consumes less current (i.e., less power) than the current mode. For example, in one application, 5 milliamps (mA) in the voltage-mode is consumed to provide a 1.0 volts (V) peak swing under 50 ohms (Ω) impedance matching, as compared with 20 mA being consumed in the current mode that provides the same/similar result. The output peak swing, however, follows the voltage of the supply voltage and is not controllable.

For a reduced (e.g., de-emphasis) swing data transmission, e.g., used in the USB 2.0 version, the current mode is usually adopted because it is fast and simple. The current-mode transmitter, however, consumes larger power. For example, in one application, 20 mA, versus 5 mA as in the voltage mode, is consumed to provide the same 1.0 V peak swing. Further, under advanced technology, e.g., 28 nanometers (nm) node, the core supply voltage is lower, e.g., about 0.85 V, which causes the driver to suffer headroom unreliability at some operational conditions.

In some approaches, the de-emphasis mode is achieved by turning on a parallel path to change the driving voltage, but the power consumption also increases, e.g., from 5 mA to 7.7 mA in some approaches, to provide a −3.5 decibel (dB) de-emphasis level from the 1.0 V peak swing.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Figure 1:
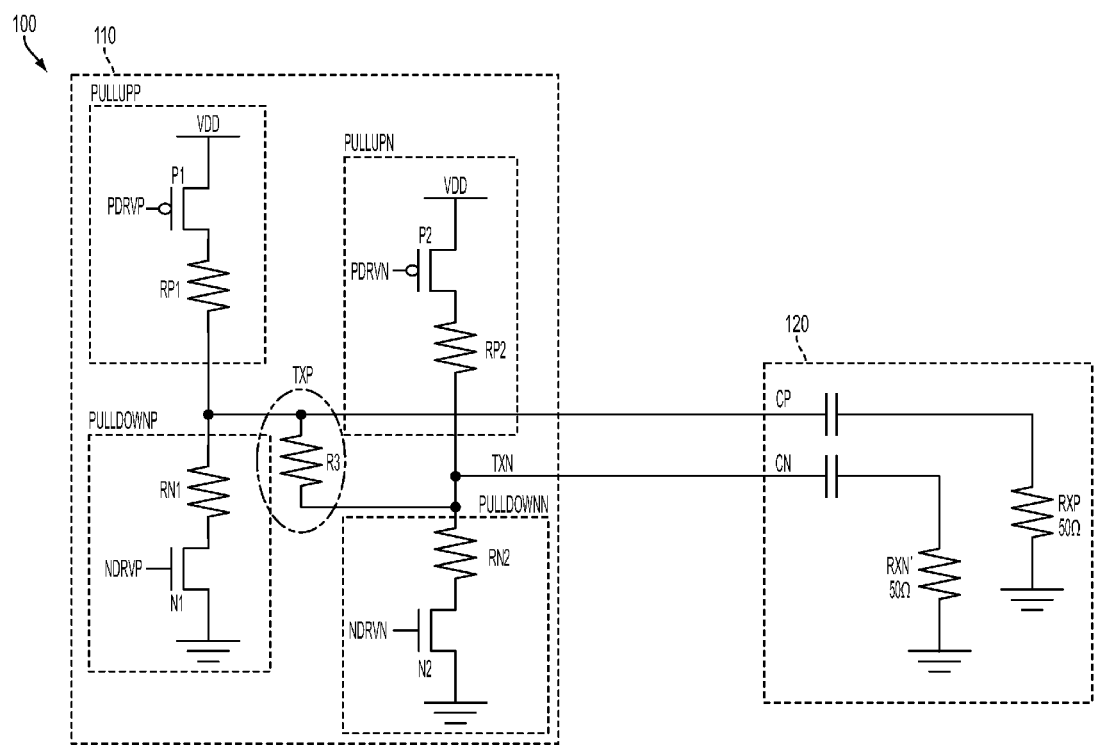
FIG. 1 is a diagram of a circuit in accordance with some embodiments.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art. Reference numbers may be repeated throughout the embodiments, but they do not require that feature(s) of one embodiment apply to another embodiment, even if they share the same reference number.

Some embodiments have one or a combination of the following advantages and/or features. The low power data transmitter is applicable for high-speed serial-link applications. The crowbar current consumption is reduced in the de-emphasis mode. The output peak signal swing is controllable, and is thus suitable for different applications. The jitter performance is better than many other approaches.

Exemplary Circuit

FIG. 1 is a diagram of a circuit 100, in accordance with some embodiments. Circuit 100 includes a transmitter 110 and a receiver 120, both of which, for simplicity, are shown with illustrative components. They, however, include additional components that are not shown. Transmitter 110 is commonly called a driver, a driving circuit, etc. Nodes TXP and TXN serve as outputs for transmitter 110. In some embodiments, nodes TXP and TXN are of opposite logic states. That is, when node TXP is at a high logic level (e.g., a High), node TXN is at a low logic level (e.g., a Low), and when node TXP is Low, node TXN is High. For illustration, voltages Vtxp and Vtxn are the voltages at respective nodes TXP and TXN. Further, the output swing Oswing of the differential signal between nodes TXP and TXN is the voltage difference between voltage Vtxp at node TXP and voltage Vtxn at node TXN. As a result, output swing Oswing is voltage Vtxp-voltage Vtxn, or voltage (Vtxp−Vtxn). Additionally, transmitter 110 operates in two modes, a normal or a full-swing mode and a de-emphasis or a reduced swing mode. In some embodiments using the middle point of a signal as a reference point, when output swing Oswing is Low in a full-swing mode, the voltage level of output swing Oswing is about −500 mV, and when output swing Oswing is High, the voltage level for output swing Oswing is about 500 mV. In a reduced-swing mode, however, the Low for output swing Oswing is about −0.333 V while the High for output swing Oswing is about 0.333 V. Stated differently, the Low for the reduced-swing mode is higher (or less negative) than the Low for the full swing mode. In contrast, the High for the reduced-swing mode is lower than the High for the full-swing mode. In some embodiments, a high frequency refers to the condition when output Oswing changes logic states in multiple consecutive transmission bits. For example, output swing Oswing continuously changes from a Low to a High then from a High to a Low for many cycles. A low frequency, in contrast, refers to the condition when output Oswing remains at a High or at a Low for multiple consecutive bits. In some embodiments, the data at nodes TXP and TXN are subject to degradation at high frequency. As a result, and the normal mode is used in high frequency transmissions to compensate for the possibility of data degradation. In contrast, the de-emphasis mode is used in low frequency transmissions.

In some embodiments, operational voltage VDD is about 1.0 V.

Circuit PullUpP includes P-type Metal-Oxide Semiconductor (PMOS) transistor P1 in series with resistor RP1 and serves as a pull-up circuit to provide a High for node TXP. For example, when transistor P1 is turned on, the voltage level at the drain of transistor P1 is pulled to the voltage at the source of transistor P1, which is voltage VDD or a High. In effect, transistor P1 pulls up the voltage level at node TXP or voltage Vtxp. PMOS transistor P1 is used in some embodiments, other types of transistors, including an N-type Metal-Oxide Semiconductor (NMOS) transistor, are within the scope of various embodiments. Transistor P1 is also considered acting as a switch. As a result, other types of switches, switching circuits, etc., are within the scope of various embodiments.

Resistor RP1 together with transistor P1 serves to match the transmission impedance of transmitter 110 and receiver 120, which is terminated by resistor RXP for node TXP. For illustration, the effective resistance or impedance of circuit PullUpP is called resistance RPullupP and includes the resistance of transistor P1 in series with the resistance of resistor RP1. In some embodiments, the resistance of resistor RP1 is selected at a predetermined value, e.g., 25Ω, and the effective resistance of transistor P1, e.g. RMP1, is selected and/or adjusted to a desired value, e.g., 25Ω, to match the 50Ω of resistor RXP. For example, transistor P1 is sized to provide the desired 25Ω resistance. In some embodiments, there is a network of transistors, e.g., transistors P1-1 to P1-X (not labeled, collectively referred to as transistor P1) coupled in parallel and series, which are then controlled to provide a selected value. For example, each transistor P1 is sized to provide a corresponding resistance of 100Ω, and four transistors P1 in parallel are selected to provide an effective resistance RMP1 of 25Ω. In some embodiments, transistor P1 is designed to provide a known resistance value and a network of resistive device including resistors is controlled to provide the resistance equivalent to that of resistor RP1. In some embodiments, resistor RP1 is not used, and, as a result, resistance RPullUpP is in effect the resistance of transistor P1 or of the network of transistors P1. The above configurations are described for illustration, various mechanisms that provide the effective resistance RPullUpP are within the scope of various embodiments.

Similarly, circuit PullUpN includes PMOS transistor P2 in series with resistor RP2 and serves as a pull-up circuit for node TXN. The function of circuit PullUpN with respect to node TXN is similar to that of circuit PullUpP with respect to node TXP. For example, transistor P2 and resistor RP2 correspond to the respective transistor P1 and resistor RP1. Consequently, their operations and configurations are similar to those of transistor P1 and resistor RP1 and should be recognizable by persons of ordinary skill in the art. For illustration, the effective resistance of circuit PullUpN is called resistance RPullupN.

Circuit PullDownP includes NMOS transistor N1 in series with resistor RN1 and serves as a pull-down circuit to provide a Low for node TXP. For example, when transistor N1 is turned on, the voltage level at the drain of transistor N1 is pulled to the voltage level at the source of transistor N1, which is ground or a Low. In effect, transistor N1 also pulls down the voltage level at node TXP or voltage Vtxp. NMOS transistor N1 is used in some embodiments, other types of transistors, including a PMOS transistor, are within the scope of various embodiments. For illustration, the effective resistance of circuit PullDownP is called resistance RPullDownP, which comprises the resistance of resistor RN1 in series with the resistance of transistor N1 (e.g., resistance RMN1). Mechanisms to provide resistance RPullDownP are similar to those that are used to provide resistance RPullDownN and should be recognizable by persons of ordinary skill in the art.

Circuit PullDownN includes NMOS transistor N2 in series with resistor RN2 and serves as a pull-down circuit to provide a Low for node TXN. The function of circuit PullDownN with respect to node TXN is similar to that of circuit PullDownP with respect to node TXP. For illustration, the effective resistance of circuit PullDownN is called resistance RPullDownN, which comprises the resistance of resistor RN2 in series with the resistance of transistor N2 (e.g., resistance RMN2). Mechanisms to provide resistance RPullDownN are similar to that of resistance RPullDownP and should be recognizable by persons of ordinary skill in the art.

Signals PDRVP, PDRVN, NDRVP, and NDRVN at the gate of the respective transistors P1, P2, N1, and N2 are used to turn on/off the respective transistors P1, P2, N1, and N2, as recognizable by persons of ordinary skill in the art.

Resistor R3, together with pull-up transistors P1 and P2 in pull-up circuits PullUpN and PullUpP and pull-down transistors N1 and N2 in pull-down circuits PullDownP and PullDownN, provides the voltage level for output swing Oswing at both the normal and the de-emphasis swing conditions. For illustration, resistor R3 is called "off" when resistor R3 is electrically disconnected between nodes TXP and TXN. In contrast, resistor R3 is "on" when resistor R3 is electrically coupled between nodes TXP and TXN. Different mechanisms to turn resistor R3 on or off are within the scope of various embodiments. Some exemplary mechanisms include, a switch, an NMOS or a PMOS transistor coupled in series with resistor R3, an NMOS transistor and/or a PMOS transistor coupled in parallel with resistor R3, etc. In some embodiments, when resistor R3 is off, output swing Oswing is at a normal level, but when resistor R3 is on, output Oswing is at a de-emphasis condition. As a result, resistor R3 is called a de-emphasis circuit. Resistor R3 is used for illustration, other de-emphasis mechanisms are within the scope of various embodiments.

Capacitors CP and CN provide alternating current (AC) coupling for nodes TXP and TXN, respectively.

Resistors RXP and RXN are termination resistors for receiver 120 corresponding to the respective nodes TXP and TXN. In some embodiments, each of resistors RXP and RXN is 50Ω. Further, the resistance RPullUpP or RPullUpN of each of the pull-up circuit or the resistance RPullDownP or RPullDownN of each of the pull-down circuit is configured to match the resistance of each of resistor RXP and RXN. Other values of resistors RXP and RXN are within the scope of various embodiments.

Differential Signal Swing at a Normal Low Level

Figure 2:
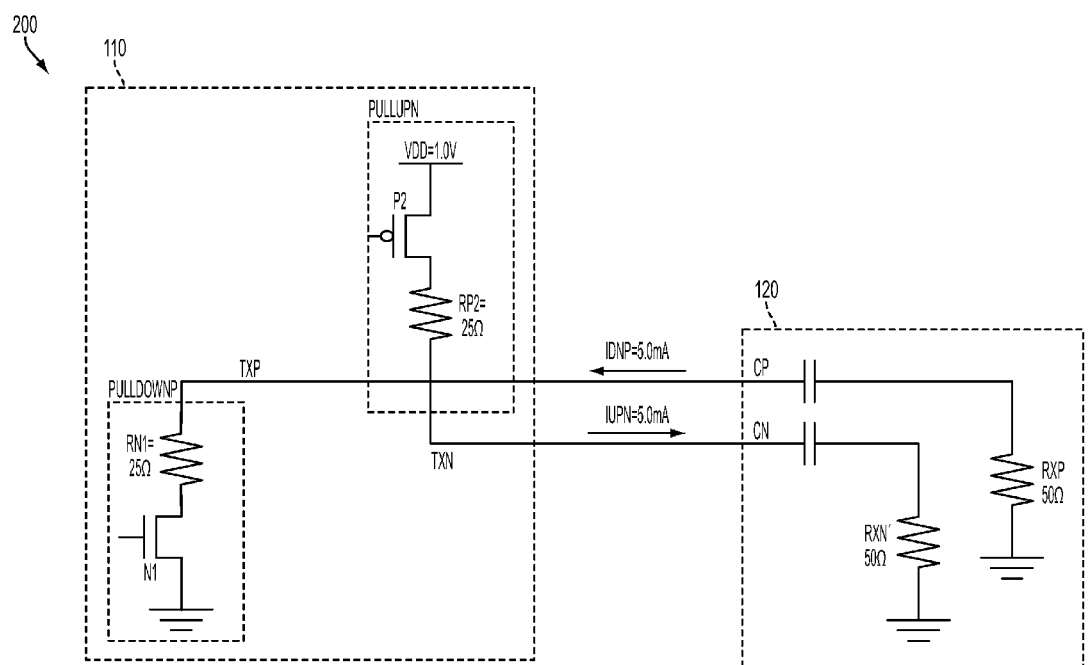
FIG. 2 is a diagram of a circuit illustrating the circuit of FIG. 1 operating in a normal output swing Low condition, in accordance with some embodiments.

FIG. 2 is a diagram of a circuit 200 illustrating circuit 100 operating in a full-swing mode and output swing Oswing is Low. In other words, output swing Oswing is at a normal Low. For simplicity, signals PDRVP, PDRVN, NDRVP, and NDRVN at the gate of the respective transistors P1, P2, N1, and N2 are not shown in FIG. 2 and subsequent FIGS. 3-10. In some embodiments, the Low for output swing Oswing in FIG. 2 is about −500 mV using the middle point of output swing Oswing as a reference point.

In circuit 200, resistor R3, transistor P1, and transistor N2 are off and therefore function as open circuits. As a result, for illustration, resistor R3, circuit PullUpP, and circuit PullDownN are not drawn in FIG. 2. Further, the respective transistors N1 and P2 are turned on which in turn turns on circuit PullDownP and circuit PullUpN. Because transistor N1 is on, the voltage level at the drain of transistor N1 is pulled to the voltage at the source of transistor N1, which is ground, or Low, or 0 V. As a result, voltage Vtxp at node TXP is pulled down. In some embodiments, voltage Vtxp is 0.25 V. Because transistor P2 is on, the voltage level at the drain of transistor P2 is pulled to the voltage level at the source of transistor P2, which is VDD, or 1 V, or High. As a result, voltage Vtxn at node TXN is pulled up. In some embodiments, voltage Vtxn is 0.75 V. Because output swing Oswing is Vtxp−Vtxn, which is 0.25 V−0.75V or −0.5 V.

In some embodiments, resistance RPullDownP of circuit PullDownP is 50Ω to match the 50Ω resistance of resistor RXP. Because resistance RPullDownP includes the resistance of resistor RN1 in series with the resistance RMN1 of transistor N1, and the resistance of resistor RN1 is 25 Ωt, resistance RMN1 is adjusted to be also 25Ω.

Similarly, resistance RPullUpN of circuit PullUpN that includes the resistance of resistor RP2 in series with resistance RMP2 of transistor P2 is 50Ω to match the 50Ω resistance of resistor RXN. Further, the resistance of resistor RP2 is 25Ω, and, as a result, resistance RMP2 is adjusted to also be 25Ω.

In some embodiments, based on the above voltage and resistance values, current IDNP flowing from node TXP through circuit PullDownP is 5.0 mA. Similarly, current IUPN flowing from circuit PullUpN to node TXN and resistor RXN, is also 5.0 mA.

Differential Signal Swing at a De-Emphasis Low Level

Figure 3:
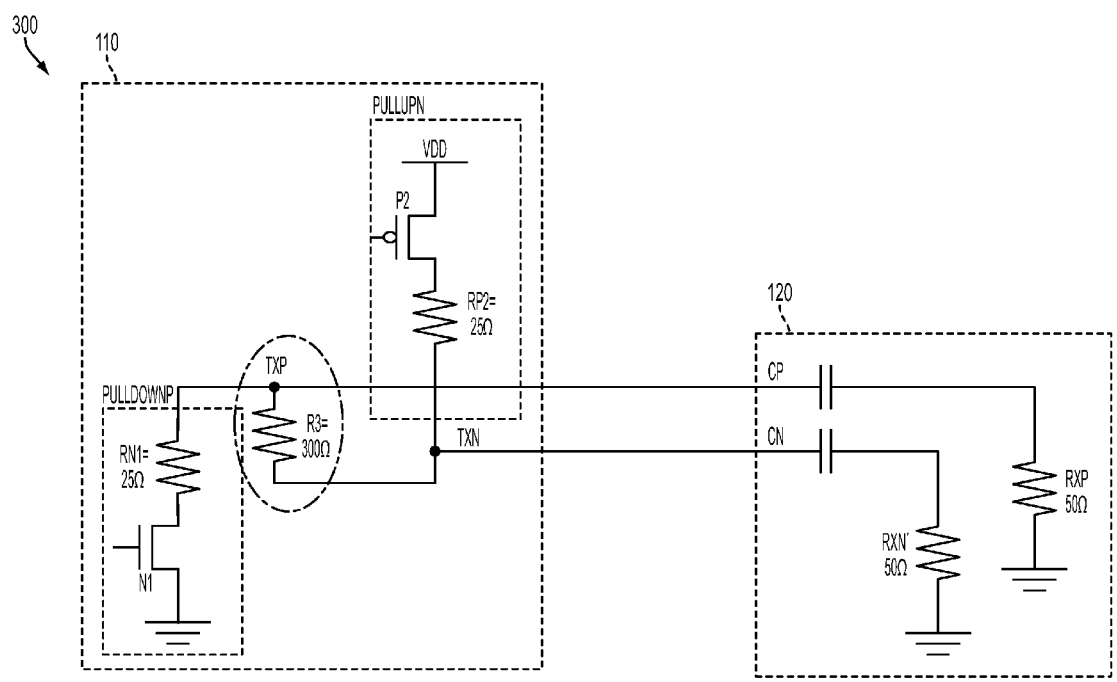
FIG. 3 is a diagram of a circuit illustrating the circuit of FIG. 1 operating in a de-emphasis output swing Low condition, in accordance with some embodiments.

FIG. 3 is a diagram of a circuit 300 illustrating the operation of circuit 100 that generates a Low for output swing Oswing in a de-emphasis condition, in accordance with some embodiments. In other words, output swing Oswing is at a de-emphasis Low level. Compared with circuit 200, resistor R3 is on in circuit 300, i.e., resistor R3 is electrically coupled between nodes TXP and TXN.

Figure 4:
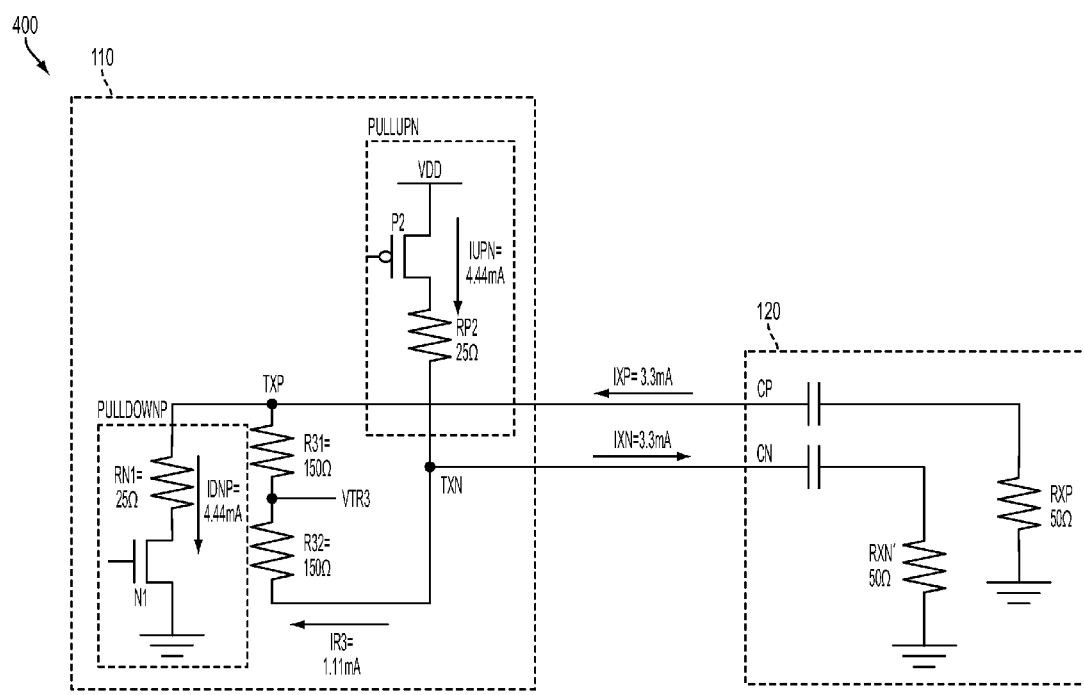
FIG. 4 is a diagram of a circuit illustrating an operational equivalence of the circuit in FIG. 3, in accordance with some embodiments.

FIG. 4 is a diagram of a circuit 400 illustrating an operation of circuit 300. Compared with circuit 300, resistor R3 in circuit 400 is functionally replaced by resistor R31 and R32. The resistance of each of resistor R31 and R32 is half of that of resistor R3, which is 150Ω in some embodiments.

In some embodiments, the voltage level of output swing Oswing is changed based on the changes of voltage Vtxp and/or voltage Vtxn, which is in turns based on the various relationships, including, for example a) the resistance at node TXP being matched to the resistance of resistor RXP and/or the resistance at node TXN being matched to the resistance of resistor RXN b) a predetermined voltage level for output swing Oswing in the de-emphasis mode compared to the voltage level of output swing Oswing in the full-swing mode and c) the currents and/or voltage levels at node TXP and/or at node TXN.

The following relationships are based on the matched resistance:

$$R\text{PullDown}P // R31 = RXP \text{ and} \tag{1}$$

$$R\text{PullUp}N // R32 = RXN \text{ or} \tag{2}$$

$$(R\text{PullDown}P + R\text{NullUp}N) // (R31 + R32) = RXP + RXN \tag{3}$$

In some embodiments, RPullDownP=RPullUpN, R31=R32, RXP=RXN=50Ω.

The following equations illustrate relationships of the predetermined voltage level for output Oswing in the de-emphasis mode compared to the voltage level of output swing Oswing in the full-swing mode:

$$D\text{swing} = F\text{swing} * D\text{ratio or} \tag{4}$$

$$Vtxpd - Vtxnd = VDD/2 * D\text{ratio or} \tag{5}$$

$$(Vtxpd + Vtxnd)/2 = VDD/2 \text{ or} \tag{6}$$

$$Vtxpd - VDD/2 = (VDD/2/2) * D\text{ratio} \tag{7}$$

wherein Dswing is output swing Oswing in the de-emphasis mode, Fswing is output Oswing in the full-swing mode, Dratio is the de-emphasis factor, Vtxpd is the voltage at node TXP in the de-emphasis mode, Vtxnd is the voltage at node TXN in the de-emphasis mode. In some embodiments, Dratio is a predetermined value of, for example, −3.5 decibels.

The following equation illustrates relationships among the currents at node TXP in the de-emphasis mode, which include the current flowing through circuit PullDownP, the current flowing through resistor R3, and the current flowing through resistor RXP:

$$(Vtxpd - GND)/R\text{PullDown}P + (Vtxpd - VDD/2)/R31 + (Vtxpd - Vcp)/RXP = 0 \tag{8}$$

wherein voltage Vcp is the voltage drop across capacitor CP (e.g., the AC coupling voltage of capacitor CP) in the de-emphasis mode. In some embodiments, voltage Vcp is known and is, for example, at 0.5 V.

Based on the above equations (1) to (8), RXP, RXN, Dratio, VDD are known, and the other parameters, e.g., RPullDownP, RPullUpN, R31, R32, R3, Vtxpd, can be calculated as recognizable by persons of ordinary skill in the art.

At node TXP, because of the symmetrical structure of circuit 100, voltage VTR3 is constant, resistor R31 is in parallel with resistor RPullDownP of circuit PullDownP. In some embodiments, the effective resistance of resistor R31 in parallel with resistor RPullDownP matches the resistance of resistor RXP, which is 50Ω. As a result, resistance RPullDownP is adjusted to be 75Ω. That is, 75Ω of RPullDownP being in parallel with 150Ω of R31 is 50Ω. Because resistor RN1 is 25Ω, resistance RMN1 of transistor N1 is adjusted to be 50Ω.

Similarly, at node TXN, because voltage VTR3 is constant, resistor R32 is in parallel with resistor RPullUpN of circuit PullUpN. In some embodiments, the effective resistance of resistor R32 in parallel with resistor RPullUpN is 50Ω to match the 50Ω resistance of resistor RXN. As a result, resistance RPullUpN is adjusted to be 75Ω. Because resistor RP2 is 25Ω, resistance RMP2 of transistor P2 is adjusted to be 50Ω.

In some embodiments, each of current IUPN and IDNP is 4.44 mA. Current IR3, the current flowing through resistor R3, is 1.11 mA. Each of current IXP and IXN flowing through respective resistors RXP and RXN is 3.3 mA. Voltage Vtxpd is 0.333V and voltage Vtxnd is 0.667V. As a result, output swing Oswing is Vtxpd−Vtxnd=0.333 V−0.667V=−0.33V. Compared with circuit 200, output swing Oswing in circuit 200 has changed from −0.5 V to −0.33V because of the change in voltages Vtxp and Vtxn caused by the electrical coupling of resistor R3 between nodes TXP and TXN.

Differential Signal Swing at a Normal High Level

Figure 5:
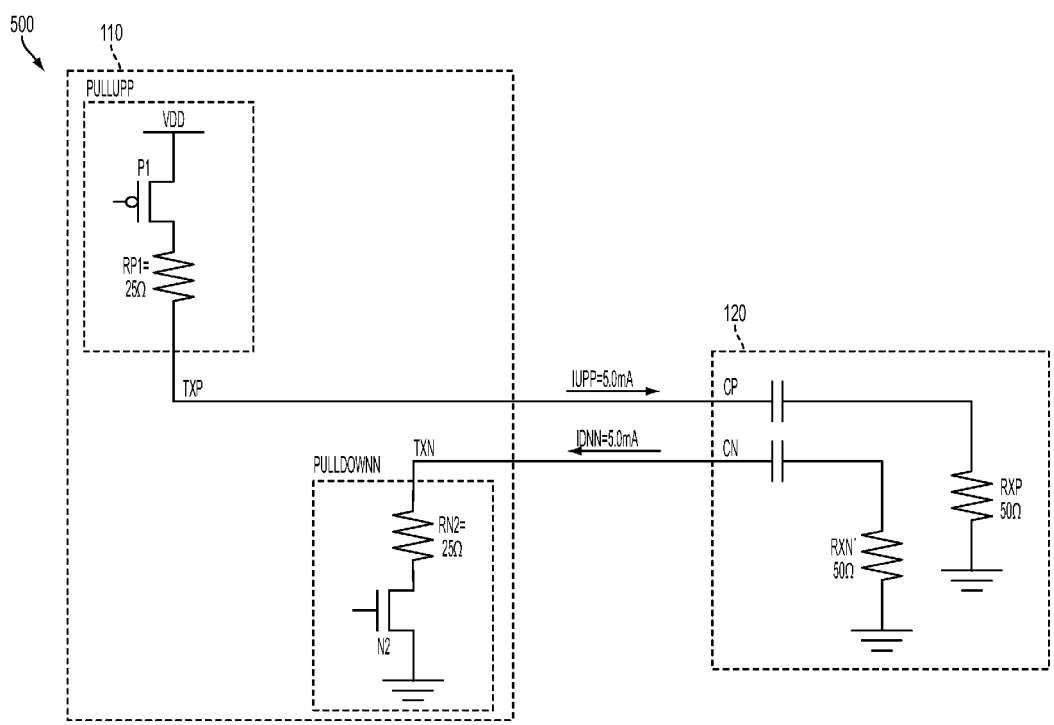
FIG. 5 is a diagram of a circuit illustrating the circuit of FIG. 1 operating in a normal output swing High condition, in accordance with some embodiments.

FIG. 5 is a diagram of a circuit 500 illustrating circuit 100 operating in a full-swing mode, and output swing Oswing is High. In other words, output swing Oswing is at a normal High. In some embodiments, the High for output swing Oswing in FIG. 5 is about 500 mV, using 0 V as a reference point for output swing Oswing.

In circuit 500, resistor R3, transistor N1, and transistor P2 are off, and therefore function as open circuits. As a result, for illustration, resistor R3, circuit PullDownP that includes transistor N1 and resistor RN1 and circuit PullUpN that includes transistor P2 and resistor RP2 are not shown in FIG. 5.

Further, transistors P1 and N2 are on. Because transistor P1 is on, voltage Vtxp at node TXP is pulled towards the voltage at the source of transistor P1, which is VDD, or High, or 1.0 V. In some embodiments, voltage Vtxp is 0.75 V. Because transistor N2 is on, voltage Vtxn at node TXN is pulled towards the voltage at the source of transistor N2, which is ground, or Low, or 0 V. In some embodiments, voltage Vtxn is 0.25 V. Because output swing Oswing is Vtxp−Vtxn, output swing Oswing is 0.5 V.

In some embodiments, resistance RPullUpP of circuit PullUpP, which includes the resistance of resistor RP1 in series with the resistance RMP1 of transistor P1, matches the 50Ω resistance of resistor RXP. Further, the resistance of resistor RP1 is 25Ω. As a result, resistance RMP1 of transistor P1 is adjusted to be 25Ω.

Similarly, resistance RPullDownN of circuit PullDownN that includes the resistance of resistor RN2 in series with resistance RMN2 of transistor N2 is 50Ω to match the 50Ω resistance of resistor RXN. Further, the resistance of resistor RN2 is 25Ω. As a result, resistance RMN2 of transistor N2 is adjusted to be 25Ω.

Based on the above voltage and resistance values, in some embodiments, current IUPP flowing through circuit PullUpP is 5.0 mA. Similarly, current IDNN flowing from node TXN through circuit PullDownN is also 5.0 mA.

Differential Signal Swing at a De-Emphasis High Level

Figure 6:
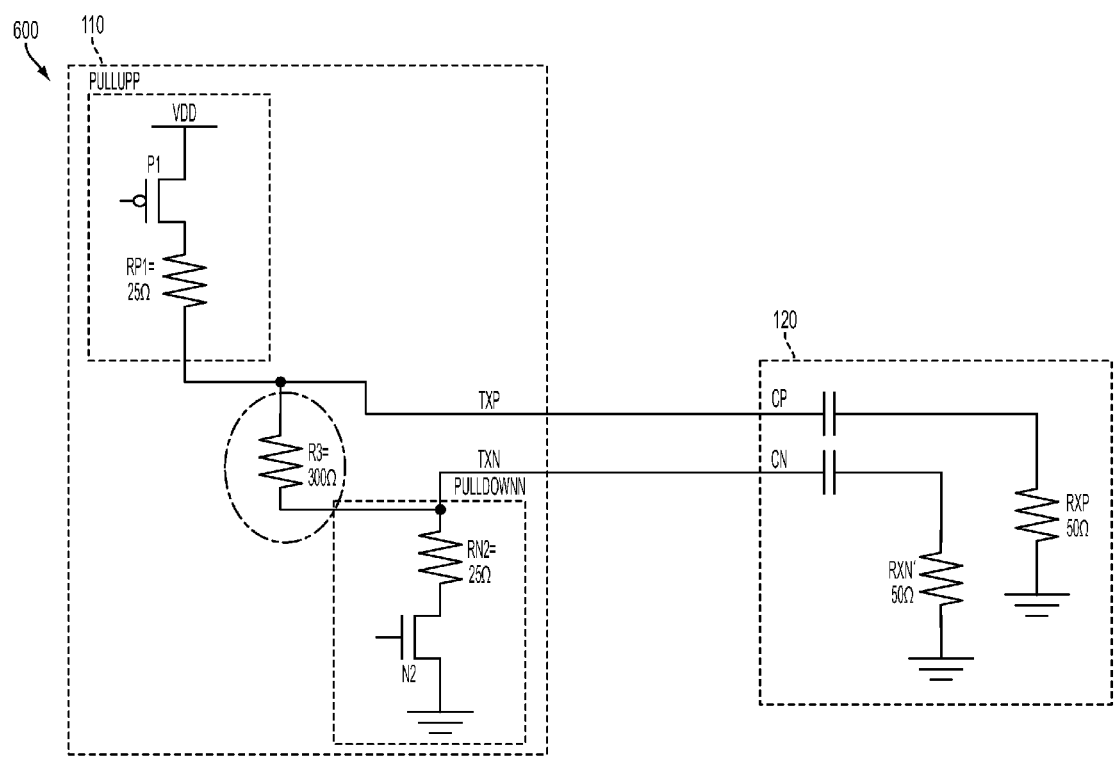
FIG. 6 is a diagram of a circuit illustrating the circuit of FIG. 1 operating in a de-emphasis output swing High condition, in accordance with some embodiments.

FIG. 6 is a diagram of a circuit 600 illustrating the operation of circuit 100 that generates a High for output swing Oswing in a de-emphasis condition, in accordance with some embodiments. In other words, output swing Oswing is at a de-emphasis High level. Compared with circuit 500, resistor R3 in circuit 600 is on, i.e., is electrically coupled between nodes TXP and TXN.

Figure 7:
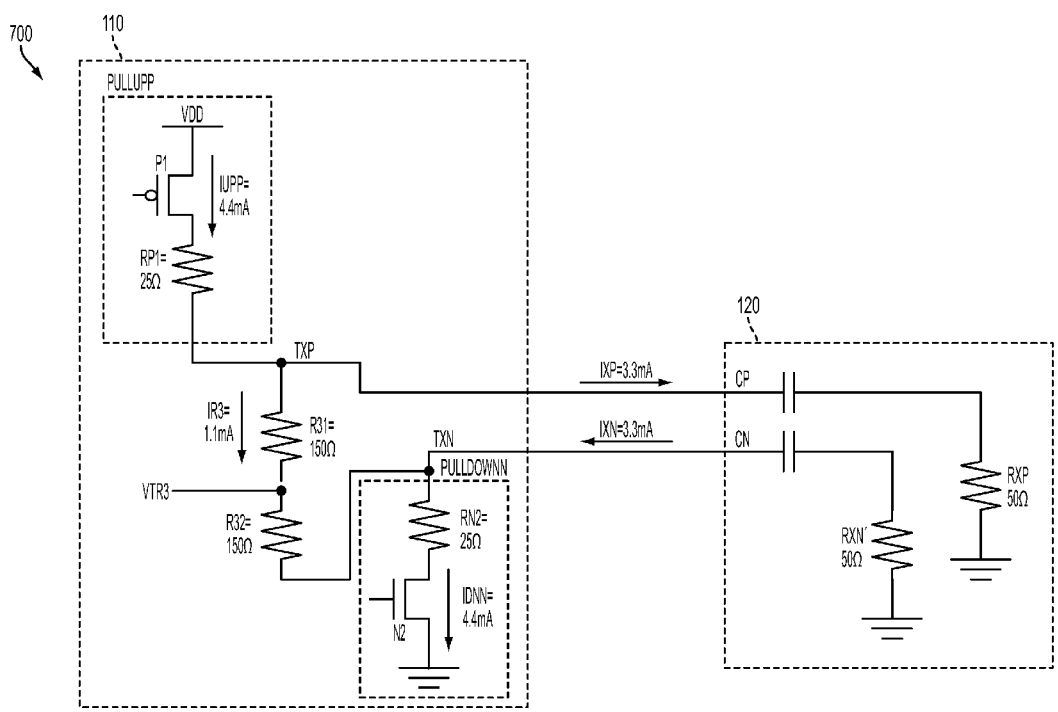
FIG. 7 is a diagram of a circuit illustrating an operational equivalence of the circuit in FIG. 6, in accordance with some embodiments.

FIG. 7 is a diagram of a circuit 700 illustrating an operation of circuit 600. Compared with circuit 600, resistor R3 in circuit 700 is functionally replaced by resistor R31 and R32. The resistance of each of resistor R31 and R32 is half of that of resistor R3, which is 150Ω, in some embodiments.

The change in voltages Vtxp and Vtxn in circuit 700 with respect to circuit 500 are the same as the change in respective voltages Vtxn and Vtxp in circuit 400 with respect to circuit 200, as explained above with reference to circuit 400 in FIG. 4.

For example, at node TXP, because voltage VTR3 is constant, resistor R31 is operationally in parallel with resistor RPullUpP of circuit PullUpP. So that the effective resistance of resistor R31 in parallel with resistor RPullUpP to be 50Ω to match the 50Ω resistance of resistor RXP, resistance RPullUpP is adjusted to be 75Ω. Because resistor RP1 is 25Ω, resistance RMP1 of transistor P1 is adjusted to be 50Ω.

Similarly, at node TXN, because voltage VTR3 is constant, resistor R32 is operationally in parallel with resistor RPullDownN of circuit PullDownN. So that the effective resistance of resistor R32 in parallel with resistor RPullDownN to be 50Ω to match the 50Ω resistance of resistor RXN, resistance RPullDownN is adjusted to be 75Ω. Because resistor RN2 is 25Ω, resistance RMN2 of transistor N2 is adjusted to be 50 Ω.

In some embodiments, each of current IUPP and IDNN is 4.44 mA. Current IR3 flowing through resistor R3 is 1.11 mA. Each of current IXP and IXN flowing through respective resistors RXP and RXN is 3.3 mA. Voltage Vtxp is 0.667V and voltage Vtxn is 0.333V. As a result, output swing Oswing is Vtxp−Vtxn=0.667V−0.333 V=0.33V. Compared with circuit 500, output swing Oswing has changed from 0.5 V to 0.33V because of the change in voltages Vtxp and Vtxn caused by the electrical coupling of resistor R3 between nodes TXP and TXN.

Various embodiments of the disclosure are advantageous over other approaches. For example, in some other approaches, in the de-emphasis mode, both transistors P1 and N1 are on. As a result, current IUPP flowing through transistor P1 also flows through transistor N1, which is called a crow bar current and further lowers the voltage level of voltage Vtxp. In contrast, in various embodiments of the present disclosure, current IUPP in the de-emphasis mode does not flow through transistor N1 because transistor N1 is off. Consequently, current IUPP does not flow as part of the crow bar current.

In some situations, the transmission channel (not shown) between transmitter 110 and receiver 120 has more signal loss (e.g., amplitude degradation) when output Oswing transitions from a High to a Low or from a Low to a High. In some embodiments, a higher signal swing is used for transitions on such transmission channel. As a result, the various circuits are configured such that the logic level of output swing Oswing after a logic transition from a Low to a High or from a High to a Low is at the normal swing level. For example, when output swing Oswing transitions from a Low to a High, circuit 500 is used so that the High is at the normal high level (e.g., 0.5 V). But if output swing Oswing transitions from a High to a Low, circuit 200 is used so that the Low is at the normal low level (e.g., −0.5 V). Effectively, in some embodiments, output swing Oswing transitions from a normal High or a de-emphasis High to a normal Low, or transitions from a normal Low or a de-emphasis Low to a normal High.

Enlarged Differential Signal Swing

In some embodiments, changing output swing Oswing is desirable, and is achieved by changing voltage VDD, which, in effect, changes voltage Vtxp and voltage Vtxn at the respective nodes TXP and TXN. For example, output swing Oswing is increased when voltage VDD is increased, and output swing Oswing is decreased when voltage VDD is decreased. In some embodiments, voltage VDD is limited, e.g., is available at 0.85 V, instead of 1.0 V, because of the shrink in process technologies. As a result, output swing Oswing is decreased. In some embodiments, techniques are provided to increase output swing Oswing.

Figure 8:
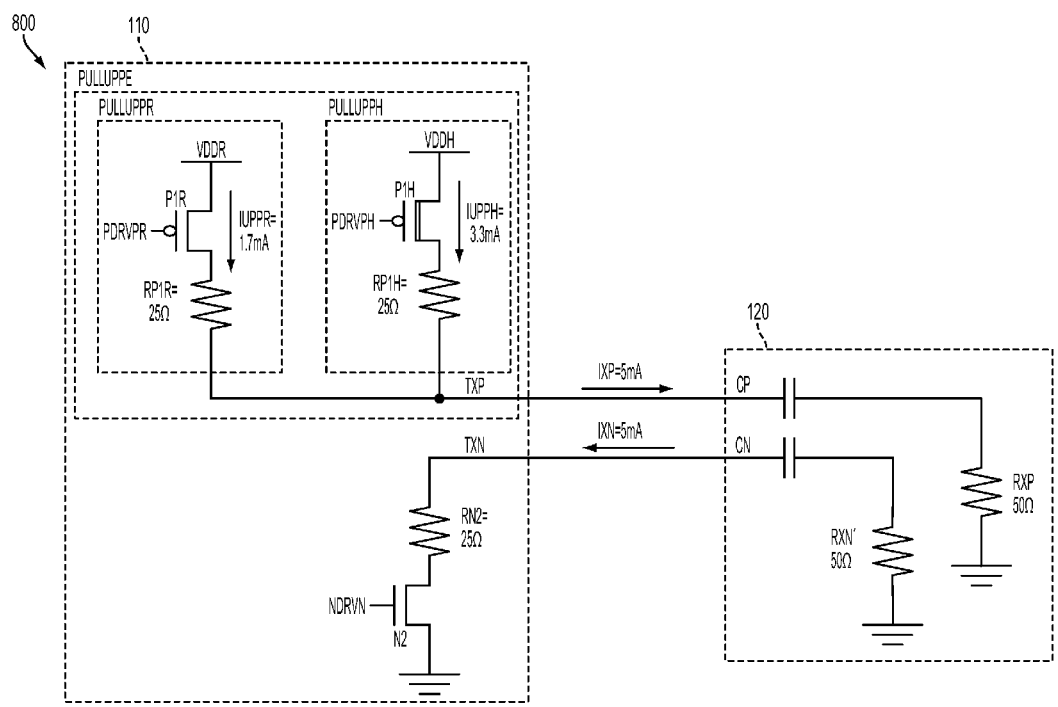
FIG. 8 is a diagram of a circuit illustrating the circuit of FIG. 1 operating in an enlarged output swing with respect to the TXN node, in accordance with some embodiments.

FIG. 8 is a diagram of a circuit 800 illustrating how output swing Oswing is increased, in accordance with some embodiments. In FIG. 8, voltage Vtxp at node TXP in a normal operation is increased to increase output swing Oswing.

Compared with circuit 500, circuit PullUpPE in circuit 800 replaces circuit PullUpP in circuit 500. For illustration, the function and operation of circuit PullUpPE is the same as the function and operation of circuit PullUpP. As a result, the effective resistance RPullupPE of circuit PullUpPE is the same as resistance RPullUpP of circuit PullUpP, which is 50Ω. Further, the equivalent voltage VDDeq (not labeled) provided by voltage VDDR and voltage VDDH is the same as voltage VDD, which is 1.0 V in circuit 100.

Circuit PullUpPE includes a first pull-up circuit PullUpPR in parallel with a second pull-up circuit PullUpPH. Circuit PullUpPR is similar to circuit PullUpP in FIG. 5 and includes transistor P1R in series with resistor RP1R corresponding to transistor P1 in series with resistor RP1 of circuit PullUpP. Voltage VDDR corresponds to voltage VDD, except in some embodiments that voltage VDDR in circuit PullUpPR is limited to 0.85 V while voltage VDD in circuit PullUpP is 1.0V. For illustration, the resistance of transistors P1R and P1H is called RP1R and RP1H, respectively.

Circuit PullUpPH includes transistor P1H in series with resistor RP1H. Alternatively stated, transistor P1H in series with resistor RP1H is in parallel with the respective transistor P1R in series with resistor RP1R. In some embodiments, transistor P1H is a "high" voltage transistor, compared to a "typical" voltage transistor P1R. That is, transistor P1H is powered by a voltage VDDH higher than voltage VDDR used to power transistor P1R. In some embodiments, voltage VDDH is about 1.8 V while voltage VDDR is about 0.85 V. Transistors VDDR and VDDH being of the same type powered by the same voltage value, however, are within the scope of various embodiments. Because circuits PullUpPR and PullupPH are in parallel, the Thevenin equivalence of circuits PullUpPR and PullUpPH that includes an equivalent voltage VDDep and an equivalent resistance RPullUpPE are calculated based on the following equations:

$$VDDep=((VDDH*RPullUpPR)+(VDDR*RPullUpPH))/(RpullUpPR+RPullUpPH) \text{ and} \quad (9)$$

$$RPullUpPE=RPullUpPR//RpullUpPH \quad (10)$$

In some embodiments, voltage VDDep is 1.0 V to correspond to voltage VDD at 1.0 V in circuit 100, and resistance RPullUpPE of circuit PullUpPE is 50Ω to correspond to the resistance RPullUpP of circuit PullUpP in circuit 100. As a result, using the Thevenin equations (9) and (10), resistance RpullUpPR and resistance RpullUpPH are 59Ω and 317Ω, respectively, which can be verified by the following relationships:

$$VDDep=((1.8*59)+(0.85*317))/(59+317)\approx1.0 \text{ V}$$

$$RPullUpPE=59 \text{ }\Omega//317 \text{ }\Omega=49.74 \text{ }\Omega\approx50\Omega$$

In some embodiments, each of resistor RP1R and resistor RP1H is 25Ω. As a result, resistance RMP1R is 34Ω, and resistance RMP1H is 292Ω (=317 Ω–25Ω). Additionally, currents IUPPR and IUPPH flowing through the respective circuits PullUpPR and PullUpPH are 1.7 mA and 3.3 mA, respectively.

In some embodiments, circuit PullUpPR and circuit PullUpPH are both on or off, for example, by using signals PDRVPR and PDRVPH to turn on or off the respective transistors P1R and P1H at the same time. Further, based on the Thevenin theory, resistance RPullUpPR and resistance RPullUpPH are adjusted to provide a predetermined voltage Vtxp. As a result, voltage Vtxp is controllable and can be higher than voltage VDDR, which, in some embodiments, is limited at a predetermined value, e.g., 0.85 V. Adjusting resistance RPullUpPR and resistance RPullUpPH is performed similarly to adjusting resistance RpullUpP and RpullUpN in FIG. 1 described above.

Circuit 800 is used to generate an increased output swing Oswing by increasing voltage Vtxp. To generate an increased output swing Oswing in the de-emphasis mode, transistor R3 is turned on, e.g., coupled between nodes TXP and TXN, as described above in reference to circuit 700 in FIG. 7.

Figure 9:
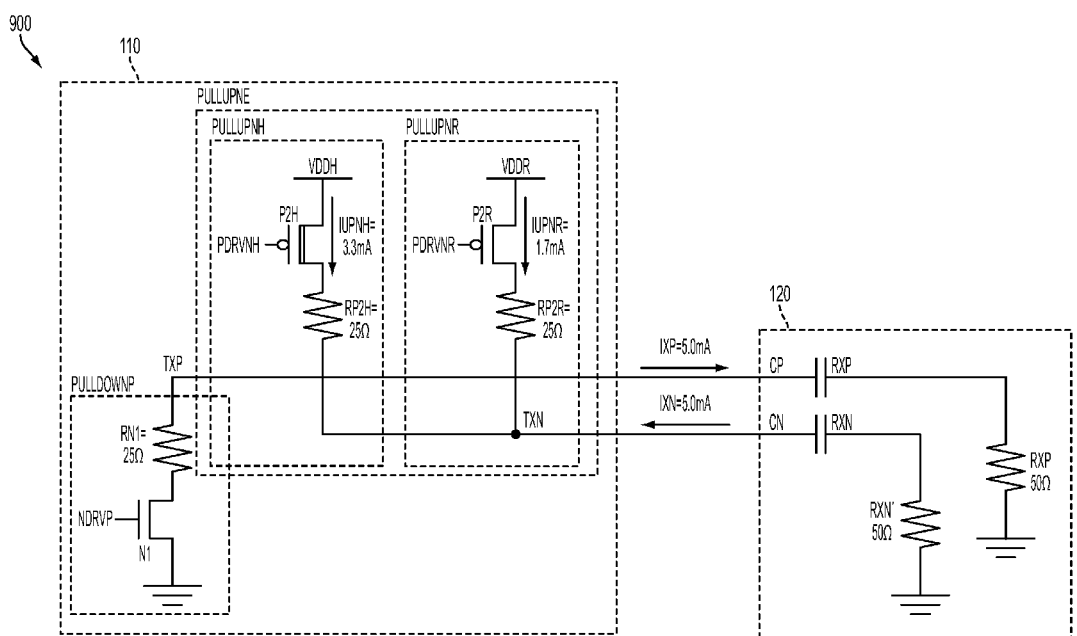
FIG. 9 is a diagram of a circuit illustrating the circuit of FIG. 1 operating in an enlarged output swing with respect to the TXP node, in accordance with some embodiments.

FIG. 9 is a diagram of a circuit 900 illustrating how output swing Oswing is increased, in accordance with some embodiments. In FIG. 8, voltage Vtxn at node TXN in a normal operation is increased to increase output swing Oswing.

Compared with circuit 200, circuit PullUpNE in circuit 900 replaces circuit PullUpN in circuit 200. For illustration, the function and operation of circuit PullUpNE is the same as the function and operation of circuit PullUpN. As a result, the effective resistance RPullupNE of circuit PullUpNE is the same as resistance RPullUpN of circuit PullUpN, which is 50Ω. Further, the equivalent voltage VDDeq (not labeled) provided by voltage VDDR and voltage VDDH is the same as voltage VDD, which is 1.0 V in circuit 100.

Circuit PullUpNE includes a first pull-up circuit PullUpNR in parallel with a second pull-up circuit, e.g., circuit PullUpNH. Circuit PullUpNR is similar to circuit PullUpN in FIG. 2 and includes transistor P2R in series with resistor RP2R corresponding to transistor P2 in series with resistor RP2 of circuit PullUpN. Voltage VDDR corresponds to voltage VDD, except in some embodiments that voltage VDDR in circuit PullUpNR is limited to 0.85 V while voltage VDD in circuit PullUpN is 1.0V. For illustration, the resistance of transistors P2R and P2H is called RP2R and RP2H, respectively.

Circuit PullUpNH includes transistor P2H in series with resistor RP2H. Alternatively stated, transistor P2H in series with resistor RP2H is in parallel with the respective transistor P2R in series with resistor RP2R. In some embodiments, transistor P2H is a "high" voltage transistor, compared to a "typical" voltage transistor P2R. That is, transistor P2H is powered by a voltage VDDH higher than voltage VDDR used to power transistor P2R. In some embodiments, voltage VDDH is about 1.8 V while voltage VDDR is about 0.85 V. Transistors VDDR and VDDH being of the same type powered by the same voltage value, however, are within the scope of various embodiments. Because circuits PullUpNR and PullupNH are in parallel, the Thevenin equivalence of circuits PullUpNR and PullUpNH that includes an equivalent voltage VDDen, and an equivalent resistance RPullUpNE are calculated based on the following equations:

$$VDDen=((VDDH*RPullUpNR)+(VDDR*RPullUpNH))/(RpullUpNR+RPullUpNH) \text{ and} \quad (11)$$

$$RPullUpNE=RPullUpNR//RpullUpNH \quad (12)$$

In some embodiments, voltage VDDen is 1.0 V to correspond to voltage VDD at 1.0 V in circuit 100, and resistance RPullUpNE of circuit PullUpNE is 50Ω to correspond to the resistance RPullUpN of circuit PullUpN in circuit 100. As a result, using the Thevenin equations (11) and (12), resistance RpullUpNR and resistance RpullUpNH are 59Ω and 317Ω, respectively, which can be verified by the following relationships:

$$VDDen=((1.8*59)+(0.85*317))/(59+317)\approx1.0\ V$$

$$RPullUpNE=59\ \Omega//317\ \Omega=49.74\ \Omega\approx50\Omega$$

In some embodiments, each of resistor RP2R and resistor RP2H is 25Ω. As a result, resistance RMP2R is 34Ω, and resistance RMP2H is 292Ω (=317 Ω−25Ω). Additionally, currents IUPNR and IUPNH flowing through the respective circuits PullUpNR and PullUpNH are 1.7 mA and 3.3 mA, respectively.

In some embodiments, circuit PullUpNR and circuit PullUpNH are both on or off, for example, by using signals PDRVNR and PDRVNH to turn on or off the respective transistors P2R and P2H at the same time. Further, based on the Thevenin theory, resistance RPullUpNR and resistance RPullUpNH are adjusted to provide a predetermined voltage Vtxn. As a result, voltage Vtxn is controllable and can be higher than voltage VDDR, which, in some embodiments, is limited at a predetermined value, e.g., 0.85 V. Adjusting resistance RPullUpNR and resistance RPullUpNH is performed similarly to adjusting resistance RPullUpP and RPullUpN in FIG. 1 described above.

Circuit 900 is used to generate an increased output swing Oswing by increasing voltage Vtxn. To generate an increased output swing Oswing in the de-emphasis mode, transistor R3 is turned on, e.g., coupled between nodes TXP and TXN, as described above in reference to circuit 400 in FIG. 4.

Figure 10:
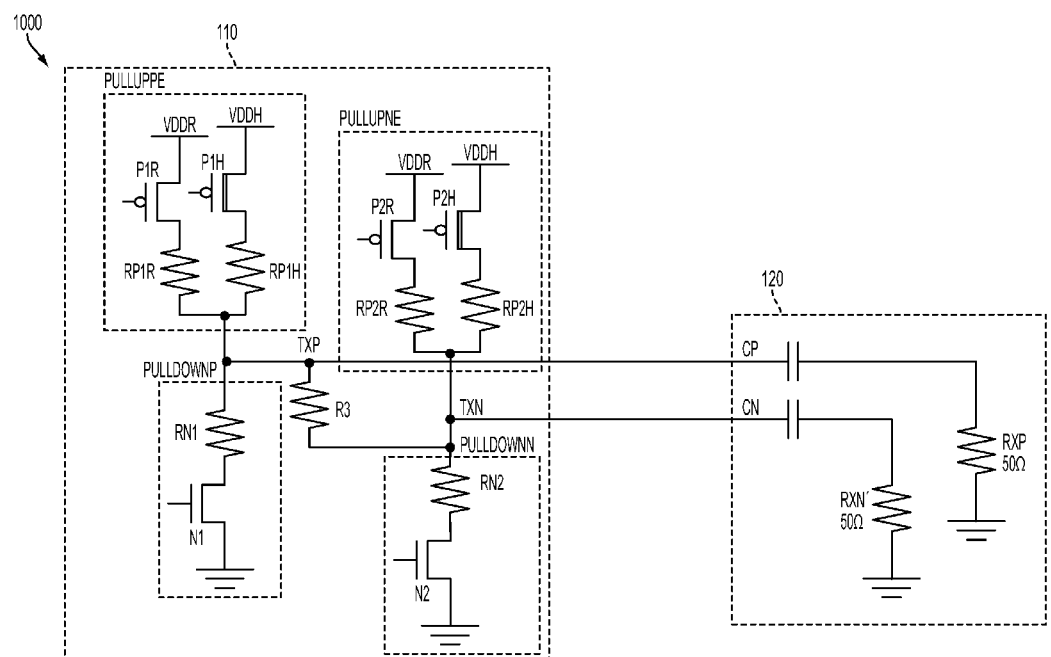
FIG. 10 is a diagram of a circuit illustrating the circuit in FIG. 1 having an enlarged output swing capability, in accordance with some embodiments.

FIG. 10 is a diagram of a circuit 1000 illustrating how output swing Oswing is enlarged at nodes TXP and TXN. Compared with circuit 100, circuit 1000 includes circuits PullUpPE and PullUpNE that replace circuits PullUpP and PullUpN, respectively. The operation of circuits PullUpPE and PullUpPN for an enlarged output swing Oswing are explained above in conjunction with the respective FIGS. 8 and 9. For example, circuit 1000 operates as circuit 800 in FIG. 8 when resistor R3, transistor N1, and transistors P2R and P2H are off. Similarly, circuit 1000 operates as circuit 900 in FIG. 9 when resistor R3, transistor N2, and transistors P1R and P1H are off. Further, circuit 1000 operates in the de-emphasis mode in conjunction with the enlarged output swing Oswing when resistor R3 is on, etc.

Circuit with Enlarged Output Swing

Some Further Embodiments

Those of ordinary skill in the art will recognize that circuit PullUpPE and PullUpNE include similar circuitries having similar components. In some embodiments, only one circuit, e.g., circuit PullUp, is used in conjunction with switches in which circuit PullUp is coupled to the node TXP for an operational equivalence of circuit PullUpPE being coupled to node TXP. Further, circuit PullUp is coupled to node TXN for an operational equivalence of circuit PullUpNE being coupled to node TXN.

Similarly, circuit PullDownP and PullDownN in FIG. 10 have similar components. In some embodiments, only one circuit PullDown is used in conjunction with switches in which circuit PullDown is coupled to node TXP for an operational equivalence of circuit PullDownP being coupled to node TXP. Further, circuit PullDown is coupled to node TXN for an operational equivalence of circuit PullDownN coupled to node TXN.

Figure 11:
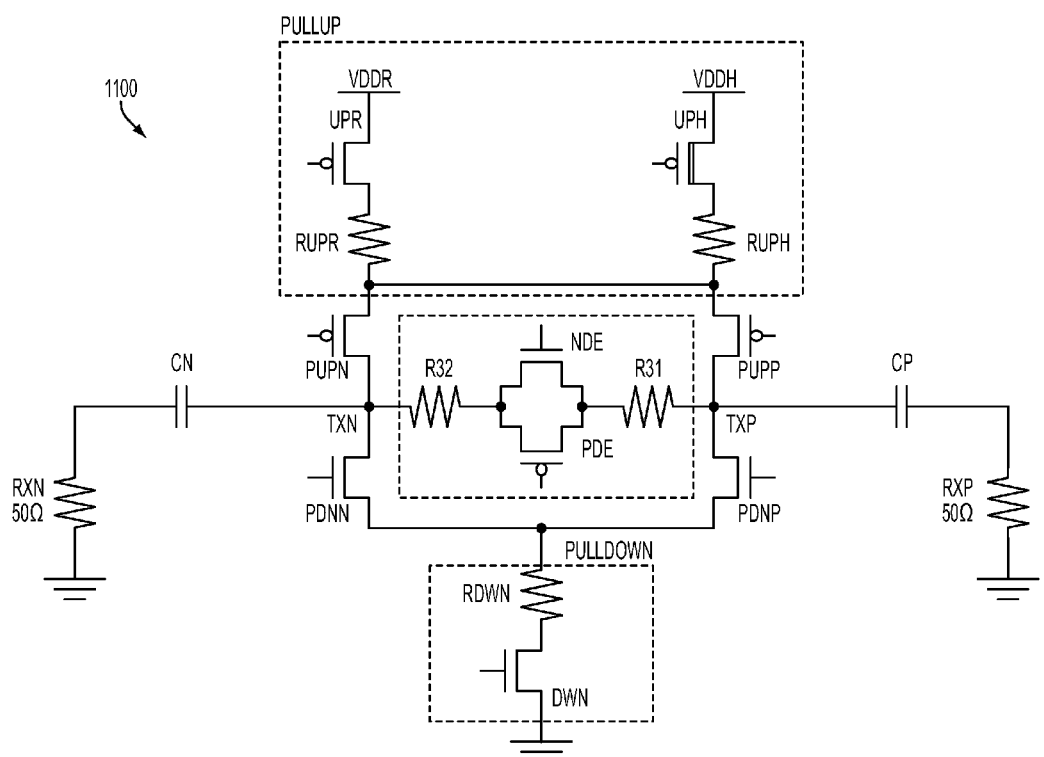
FIG. 11 is a diagram of an exemplary circuit having an enlarged output swing capability, in accordance with some further embodiments.

FIG. 11 is a diagram of a circuit 1100 illustrating an operation of circuit 1000 having an enlarged output swing feature, in accordance with some embodiments. Circuit 1100 has similar features as circuit 1000, but with different components in different configurations. For simplicity, signals used to turn on/off transistors in FIG. 11 are not labeled, but the operation of the respective transistors will be recognizable by persons of ordinary skill in the art. For example, a High applied at a gate of an NMOS transistor turns on that NMOS transistor, and a Low applied at the gate of the same NMOS transistor turns off that NMOS transistor. Similarly, a Low applied at a gate of a PMOS transistor turns on that PMOS transistor, and a High applied at the gate of the same PMOS transistor turns off that PMOS transistor.

Compared with circuit 1000, circuit PullUp and PMOS transistors PUPP and PUPN in circuit 1100 replace circuit PullUpPE and circuit PullUpNE in circuit 1000. In some embodiments, when transistor PUPP is on, transistor PUPN is off. As a result, circuit PullUp is electrically coupled to node TXP, which is operationally equivalent to circuit PullUpPE being coupled to node TXP. Similarly, when transistor PUPN is on, transistor PUPP is off. As a result, circuit PullUp is electrically coupled to node TXN, which is operationally equivalent to circuit PullUpNE being coupled to node TXN. Further, transistor UPR corresponds to transistors P1R and P2R. Transistor UPH corresponds to transistors P1H and P2H. Resistor RUPR corresponds to resistor RP1R and RP2R. Resistor RUPH corresponds to resistor RP1H and RP2H.

Circuit PullDown and transistors PDNN and PDNP in circuit 1100 replace circuits PullDownP and PullDownN in circuit 1000. In some embodiments, when transistor PDNN is off, transistor PDNP is on. As a result, circuit PullDown is electrically coupled to node TXP, which is operationally equivalent to circuit PullDownP being coupled to node TXP. Similarly, when transistor PDNP is off, transistor PDNN is on. As a result, circuit PullDown is electrically coupled to node TXN, which is operationally equivalent to circuit PullDownN being coupled to node TXN.

Resistors R31 and R32 and transistors NDE and PDE in circuit 1100 replace resistor R3 in circuit 1000. Each of resistors R31 and R32 has a resistance half of that of resistor R3. When one or a combination of transistor NDE and transistor PDE is on, resistor R31 in series with resistor R32, which is equivalent to resistor R3, is coupled between nodes TXP and TXN. But when both transistors NDE and PDE are off, resistors R31 and R32, or resistor R3, are electrically disconnected from nodes TXP and TXN.

Circuit 1100 is functionally equivalent to circuit 800 when transistor PUPP is on and transistor PUPN is off; transistor PDNN is on, and transistor PDNP is off; and resistors R31 and R32 are disconnected from nodes TXP and TXN. Because transistor PUPP is on, circuit PullUp is electrically coupled to node TXP. Because transistor PDNN is on, circuit PullDown is electrically coupled to node TXN. When, however, resistors R31 and R32, or resistor R3, are on, circuit 1100 operates in the de-emphasis mode.

Circuit 1100 is functionally equivalent to circuit 900 when transistor PUPN is on, and transistor PUPP is off; transistor PDNP is on, and transistor PDNN is off; and resistors R31 and R32 are disconnected from nodes TXP and TXN. Because transistor PUPN is on, circuit PullUp is electrically coupled to node TXN. Because transistor PDNP is on, circuit PullDown is electrically coupled to node TXP. When, however, resistors R31 and R32, or resistor R3, are on, circuit 1100 operates in the de-emphasis mode.

Exemplary Method

Figure 12:
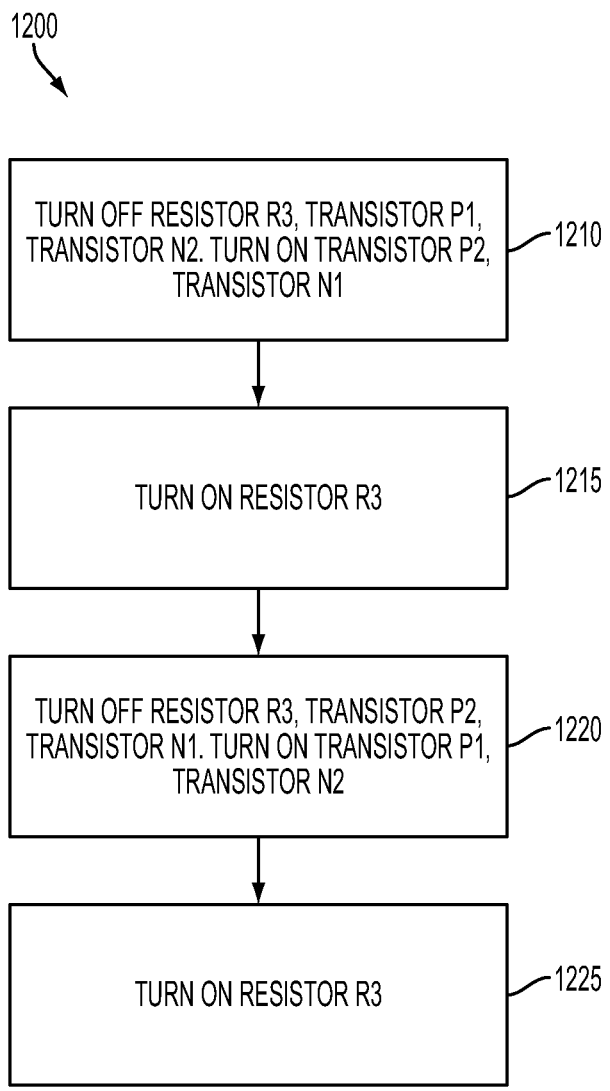
FIG. 12 is a flowchart illustrating the operation of circuit 100, in accordance with some embodiments.

FIG. 12 is a flowchart 1200 illustrating the operation of circuit 100, in accordance with some embodiments.

In step 1210, resistor R3, transistor P1 and transistor N2 are turned off. Further, transistor P2 and transistor N1 are turned on. Output swing Oswing is at the normal Low level. Circuit 100 thus transmits a logic Low under the normal output swing Oswing.

In step 1215, resistor R3 is turned on. Output swing Oswing is at the de-emphasis Low level. Circuit 100 thus transmits a logic Low under the de-emphasis output swing Oswing.

In step 1220, resistor R3, transistor P2 and transistor N1 are turned off. Transistor P1 and transistor N2 are turned on. As a result, output swing Oswing is at the normal High level. Circuit 100 thus transmits a logic High under the normal output swing Oswing.

In step 1225, resistor R3 is turned on. Output swing Oswing is at the de-emphasis High level. Circuit 100 thus transmits a logic High under the de-emphasis output swing Oswing.

In FIG. 12, circuit 100 is illustratively used to generate the normal Low, de-emphasis Low, normal High, and de-emphasis High for output swing Oswing. Using the flowchart 1200 of FIG. 12, circuit 1000 or 1100 is used to create the normal enlarged Low, de-emphasis enlarged Low, normal enlarged High, and de-emphasis enlarged High, consistent with the spirit and scope of the various embodiments disclosed in this document.

A number of embodiments have been described. It will nevertheless be understood that various modifications may be made without departing from the spirit and scope of the disclosure. For example, the various transistors being shown as a particular dopant type (e.g., NMOS and PMOS) are for illustration purposes, embodiments of the disclosure are not limited to a particular type, but the dopant type selected for a particular transistor is a design choice and is within the scope of various embodiments. The logic level (e.g., low or high) of the various signals used in the above description is also for illustration purposes, various embodiments are not limited to a particular level when a signal is activated and/or deactivated, but, rather, selecting such a level is a matter of design choice. Because various transistors (e.g., transistor PUPN, PUPP, PDNN, PDNP, etc.) function as switches, other devices, switches, switching circuitries, etc., can be use in place of those transistors.

The various figures show discrete resistors and capacitors for illustration, equivalent circuitry may be used. For example, a resistive device, circuitry or network (e.g., a combination of resistors, resistive devices, circuitry, etc.) can be used in place of the corresponding resistor. Similarly, a capacitive device, circuitry or network (e.g., a combination of capacitors, capacitive devices, circuitry, etc.) can be used in place of the corresponding capacitor.

Some embodiments regard a circuit that includes a first node, a second node, a pull-up circuit selectively coupled to the first node or the second node, a pull-down circuit selectively coupled to the first node or the second node, and a resistive circuit. The circuit is configured to operate in a full-swing mode or in a de-emphasis mode based on an electrical coupling of the resistive circuit between the first node and the second node.

Some embodiments regard a method that includes: operating the circuit in a first mode wherein an output swing between a first node and a second node of the circuit has a first low voltage level and a de-emphasis circuit is electrically disconnected between the first node and the second node; operating the circuit in a second mode wherein the output swing has a second low voltage level and the de-emphasis circuit is electrically connected between the first node and the second node; operating the circuit in a third mode wherein the output swing has a first high voltage level and the de-emphasis circuit is electrically disconnected between the first node and the second node; and operating the circuit in a fourth mode wherein the output swing has a second high voltage level and the de-emphasis circuit is electrically connected between the first node and the second node.

Some embodiments regard a method that includes: using a pull-up circuit to generate a high voltage level at a first node or a second node, using a pull-down circuit to generate a low voltage level at the first node or the second node; identifying a swing voltage between the first node and the second node, based on the high voltage level and the low voltage level, and using a de-emphasis circuit coupled between the first node and the second node to change the swing voltage.

The above methods show exemplary steps, but they are not necessarily performed in the order shown. Steps may be added, replaced, changed order, and/or eliminated as appropriate, in accordance with the spirit and scope of disclosed embodiments.

What is claimed is:

1. A circuit comprising:
   a first node;
   a second node;
   a pull-up circuit selectively coupled to the first node or the second node, the pull up circuit comprising:
      a first pull-up circuit having a first pull-up transistor coupled with a first pull-up resistive device, the first pull-up transistor being coupled to a first power source configured to carry a voltage having a first voltage level; and
      a second pull-up circuit having a second pull-up transistor coupled with a second pull-up resistive device, the second pull-up transistor being coupled to a second power source configured to carry a voltage having a second voltage level greater than the first voltage level;
   a pull-down circuit selectively coupled to the other of the first node or the second node; and
   a resistive circuit disconnectably coupled between the first node and the second node;
   wherein the resistive circuit is configured to set the circuit in either a full-swing mode or in a de-emphasis mode in response to a control signal.

2. The circuit of claim 1 wherein the pull-up circuit is configured to electrically couple to the first node and the pull-down circuit is configured to electrically couple to the second node.

3. The circuit of claim 1 wherein when the circuit operates in the de-emphasis mode, the circuit is configured to satisfy at least one of the following conditions:
   a first resistance of the pull up circuit matches a first termination resistance; and
   a second resistance of the pull down circuit matches a second termination resistance.

4. The circuit of claim 1 configured to satisfy at least one of the following conditions:
   a first resistance of the pull-up circuit is adjustable; and
   a second resistance of the pull-down circuit is adjustable.

5. The circuit of claim 1 wherein the pull-up circuit includes at least one pull-up transistor coupled to the first node and the pull-down circuit includes at least one pull-down transistor coupled to the second node.

6. The circuit of claim 1 wherein:
the pull-up circuit includes at least one pull-up transistor coupled with at least one pull-up resistive circuit, and is configured to provide a pull-up resistance based on configuration of the at least one pull-up transistor and the at least one pull-up resistive circuit, and
the pull-down circuit includes at least one pull-down resistive circuit coupled with at least one pull-down transistor, and is configured to provide a pull-down resistance based on configuration of the at least one pull-down transistor and the at least one pull-down resistive circuit.

7. The circuit of claim 1 further comprising a first switch configured to electrically couple the pull-up circuit to the first node and a second switch configured to electrically couple the pull-up circuit to the second node.

8. The circuit of claim 1 further comprising a first switch configured to electrically couple the pull-down circuit to the first node and a second switch configured to electrically couple the pull-down circuit to the second node.

9. The circuit of claim 1, wherein the circuit is configured to operate in the de-emphasis mode based on one or more of a pre-determined de-emphasis factor, a first de-emphasis value of a first voltage at the first node, a second de-emphasis value of a second voltage at the second node, and a de-emphasis voltage swing between the first node and the second node.

10. The circuit of claim 1 wherein when the circuit is configured to operate in the de-emphasis mode, one or more of the pull-up circuit and the pull-down circuit is configured to change one or more of a pull-up resistance of the pull-up circuit and a pull-down resistance of the pull-down circuit.

11. A method comprising:
using a pull-up circuit to generate a high voltage level at a first node or a second node, the pull-up circuit being electrically coupled to a first voltage source configured to carry a voltage having a first voltage level and a second voltage source configured to carry a voltage having a second voltage level greater than the first voltage level;
using a pull-down circuit to generate a low voltage level at the other of the first node or the second node; and
using a de-emphasis circuit coupled between the first node and the second node to change the swing voltage by one of electrically coupling or decoupling the first node and the second node via the de-emphasis circuit.

12. The method of claim 11 further comprising at least one of the following steps:
matching a first resistance at the first node to a first termination resistance; or
matching a second resistance at the second node to a second termination resistance.

13. The method of claim 11 wherein:
the pull-up circuit includes a first circuit in parallel with a second circuit;
the first circuit is powered by the first voltage source; and
the second circuit is powered by the second voltage source.

14. The method of claim 13 wherein:
the first circuit includes at least one first resistor coupled in series with at least one first transistor powered by the first voltage source; and
the second circuit includes at least one second resistor coupled in series with at least one second transistor powered by the second voltage source.

15. A circuit comprising:
a first node;
a second node;
a third node;
a fourth node;
a pull-up circuit, comprising:
a first pull-up circuit coupled between the third node and a first power node configured to carry a voltage having a first voltage level; and
a second-pull-up circuit coupled between the third node and a second power node configured to carry a voltage having a second voltage level greater than the first voltage level;
a first switch coupled between the first node and the third node;
a second switch coupled between the second node and the third node;
a pull-down circuit coupled between the fourth node and a third power node configured to carry a third voltage level less than the first and second voltage level;
a third switch coupled between the first node and the fourth node;
a fourth switch coupled between the second node and the fourth node; and
a resistive circuit disconnectably coupled between the first node and the second node, the resistive circuit being configured to set the circuit in either a full-swing mode or in a de-emphasis mode responsive to a control signal.

16. The circuit of claim 15, wherein the resistive circuit comprises:
a fifth switch configured to be turned on or off responsive to the control signal;
a first resistor coupled between the fifth switch and the first node; and
a second resistor coupled between the fifth switch and the second node.

17. The circuit of claim 16, wherein the first resistor and the second resistor have substantially the same resistance value.

18. The circuit of claim 15, wherein a resistance value observed at the first node or the second node matches a predetermined termination resistance value.

19. The circuit of claim 15, wherein a resistance of the pull-up circuit is adjustable.

20. The circuit of claim 15, wherein the first pull-up circuit comprises a resistor and a transistor coupled in series between the first power node and the third node.

* * * * *